Figure 1:
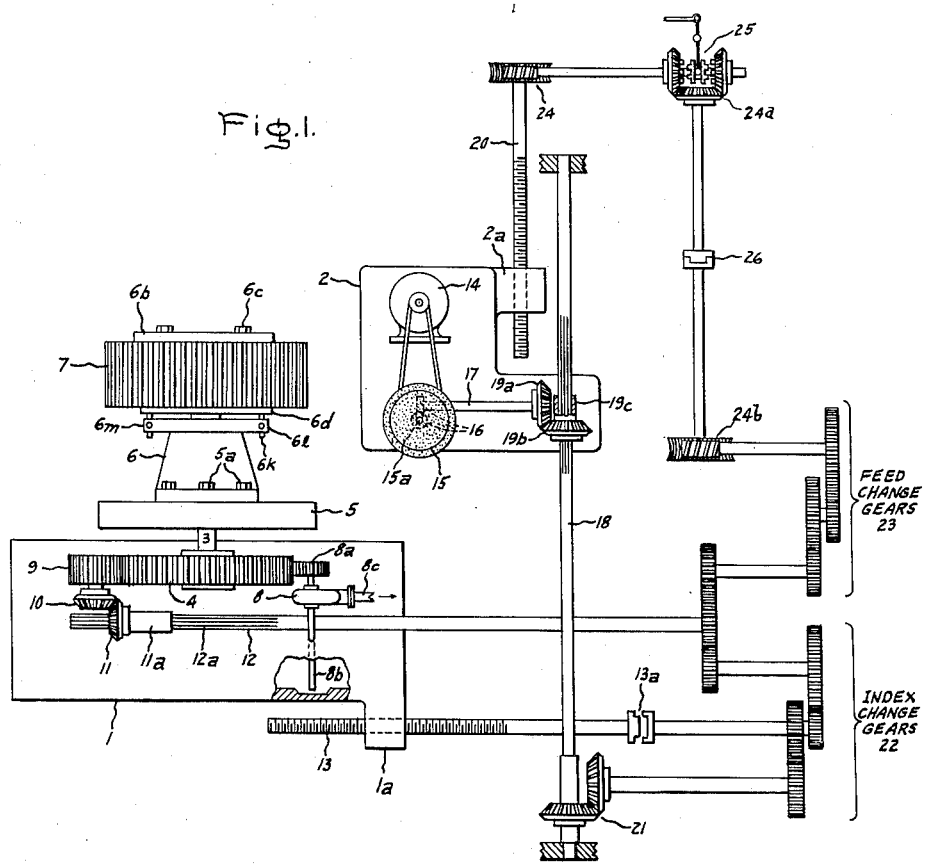

Jan. 3, 1956  A. H. PRUCKNICKI ET AL  2,729,033
HOBBING TYPE APPARATUS AND METHOD FOR GRINDING GEARS
Filed Dec. 15, 1952  2 Sheets-Sheet 1

FEED CHANGE GEARS 23

INDEX CHANGE GEARS 22

Inventors:
Andrew H. Prucknicki,
Frank P. Hennessy,
William J. Berrigan,
by Richard E. Hooley
Their Attorney.

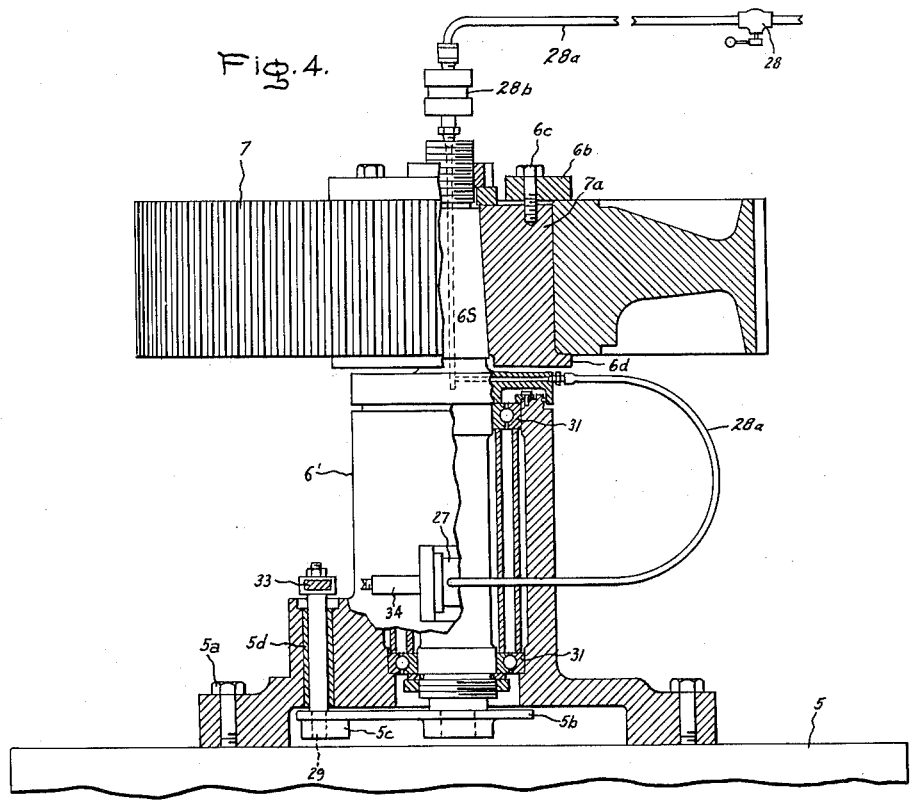
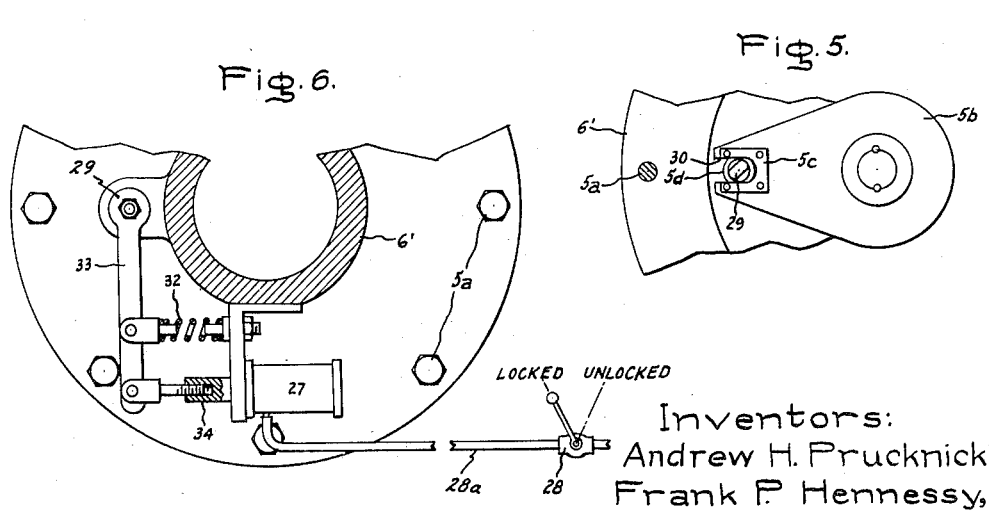
Inventors:
Andrew H. Prucknicki,
Frank P. Hennessy,
William J. Berrigan,
by Richard E. Hesley
Their Attorney.

United States Patent Office 2,729,033
Patented Jan. 3, 1956

2,729,033

HOBBING TYPE APPARATUS AND METHOD FOR GRINDING GEARS

Andrew H. Prucknicki, Dorchester, Frank P. Hennessy, Wakefield, and William J. Berrigan, Lynn, Mass., assignors to General Electric Company, a corporation of New York Application December 15, 1952, Serial No. 326,088

6 Claims. (Cl. 51—52)

This invention relates to gear grinding equipment, particularly to a hobbing type gear grinder and the method of employing it.

Hobbing type gear grinders are known, one such machine being disclosed, for instance, in the United States patent to Ross 2,307,238, issued January 5, 1943. Such equipment is capable of a degree of accuracy and a perfection of finish not obtainable with other gear finishing methods. However, the high degree of precision desired in the gear being ground necessitate the employment of every device known to the art to avoid the introduction of inaccuracies due to vibration of the machine, variations in the electrical power supply of the driving motor, deflections under load occurring in the machine parts and the work piece, and "back-lash" or "wind-up" due to twisting of the drive shafts and change in loading of the oil films in the bearings and between the gear teeth, and other factors too numerous to mention. Combinations of these factors, each apparently small in itself, are capable of producing defects in the gear finish which cannot be tolerated.

One defect which has ben particularly troublesome is what has come to be known as a "fish-scale" effect, visible only under certain lighting conditions and composed of regularly repeated discontinuities in the tooth surface which represent such a very small deviation from the theoretically correct surface as not to affect substantially the operation of the gear. However, since the defect is visible, it has an extremely serious effect on the acceptability of the gear, in competition with gears finished by other processes which, while not as accurately cut, still present an apparently flawless surface to the eye.

Accordingly, it has become necessary to take extreme measures to eliminate this characteristic fish-scale defect in order to make high precision gears finished by a hobbing type grinding operation competitive with less accurately finished gears produced by other processes.

Therefore, an object of the invention is to provide an improved apparatus and method for finish grinding gears by a hobbing operation which tends to eliminate the above-described fish-scale defect.

A further object is to provide improved supporting arrangements for the gear being finished for effecting the novel method of operation by which the fish-scale defect is avoided.

Figure 2:
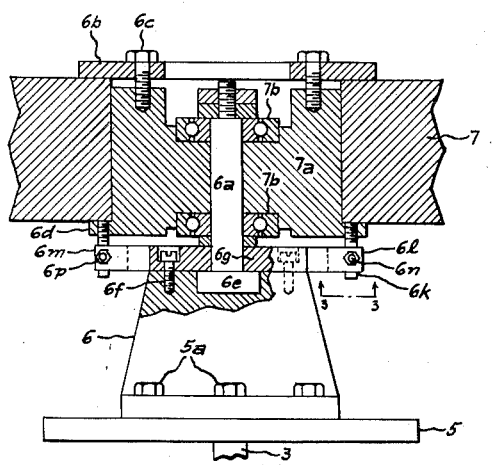
Figure 3:
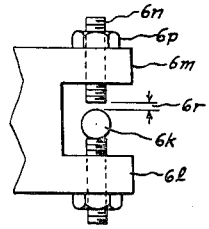

Other objects and advantages will become apparent from the following description taken in connection with the accompanying drawings, in which Fig. 1 is a diagrammatic representation of the complete hobbing type gear grinding machine, Fig. 2 is a detail in section of a portion of the fixture for holding the work-piece, Fig. 3 is a detail view taken in the direction 3—3 in Fig. 2, and Figs. 4, 5, and 6, are detail views of an alternate form of the work-holding fixture shown in Figs. 2 and 3.

Generally stated, the invention is practiced by providing a special work-holding fixture capable of either supporting the work-piece in absolutely fixed relation to the work-carrying spindle, or, alternatively, capable of providing a preselected limited degree of oscillation of the work-piece relative to the work-supporting spindle. During the main portion of the cutting process, the workpiece is fixed relative to the spindle. During the final finishing phase of the cutting operation, the work-piece is unlocked so as to be free to oscillate a very limited amount relative to the spindle.

Referring now to Fig. 1, the grinding machine comprises a work supporting carriage assembly indicated generally at 1, a grinding wheel supporting carriage indicated generally at 2, and appropriate power transmission shafting and lead-screws, with suitable feed and index gearing, for moving the hobbing type grinding wheel in proper synchronism with the motion of the work-piece.

The work support carriage 1 has suitable bearings (not shown) supporting a work driving spindle 3 carrying at its lower end a driven gear 4 and at its upper end a work supporting table 5. The table is, of course, adapted to have secured thereto a suitable work-holding fixture indicated generally at 6, which in turn supports the gear 7 to be finished.

It is to be noted that lubricating oil, or hydraulic fluid for other purposes, is provided by a pump 8 secured to the carriage 1 and driven by a pinion 8a engaging the gear 4. Pump 8 may have its suction conduit 8b arranged to draw liquid from a suitable sump in the carriage assembly and discharge through a conduit 8c to the devices lubricated or hydraulic actuators powered by the pump.

Power is delivered to the work drive gear 4 by a pinion 9 connected to a bevel gear 10 meshing with a mating gear 11 carried in a bearing 11a on carriage 1. Slidably projecting through gear 11 is a drive shaft 12, which of course has a longitudinally extending external spline or keyway 12a engaging an internal spline (not shown) associated with pinion 11. The work-supporting carriage 1 is positioned radially relative to the grinding wheel carriage 2 by a lead-screw 13 shown diagrammatically as threadedly engaging a projecting portion 1a of the work-support carriage.

The grinding wheel carriage assembly 2 includes a main driving motor 14 connected by suitable means, for instance a multiple V-belt drive, to the spindle 15a of the hobbing type grinding wheel 15. This wheel may have a single helical thread of rack or modified rack profile. Spindle 15a is connected by suitable gears shown in dotted lines at 16 to a main power take-off shaft 17. Shaft 17 is connected to drive-shaft 18 by a bevel gear 19a meshing with a gear 19b supported by bearing 19c on carriage 2 and keyed to slide longitudinally on the shaft 18. Vertical positioning and feeding of the carriage 2 is effected by the vertical lead-screw 20 threadedly engaging a portion 2a of the grinding wheel carriage.

The main vertical drive-shaft 18 is connected by bevel gears 21 to the "index change gearing" shown generally at 22 and the "feed change gearing" shown generally at 23. The details of these speed changing gear trains are not material to an understanding of the present invention and will be sufficiently obvious from the drawing. The in-feed mechanism is of course actuated intermittently, either automatically or manually, as indicated diagrammatically by the clutch 13a. The workpiece 7 may be fed radially toward the grinding wheel 15 for initial positioning by either manual or power rotation of the lead screw 13. Likewise, the progressive feeding of the grinding wheel radially into the work-piece during the cutting operation may be accomplished manually, between vertical passes of the grinding wheel, or automatically by suitable power means (not shown).

It will also be apparent from the drawing how the power supply shaft 12 to the work carriage 1 is driven from the index change gearing. The vertical feed screw 20 is connected by gears 24, 24a, 24b to the feed change gearing 23. The vertical power feed may be disconnected or reversed by a suitable "three-position" clutch, shown diagrammatically at 25.

It will be understood by those familiar with such machine tools that the work 7 is driven in proper synchronism with the hobbing type grinding wheel 15, while the vertical feed screw 20 causes the grinding wheel to make a vertical pass through the teeth of the gear. At the completion of each pass, the direction of travel of the grinding wheel carriage 2 is reversed by automatic means (not shown) for actuating clutch 25, and the grinding wheel is caused to pass vertically through the gear again. Each vertical pass is of course made with carriage 2 positioned a little closer to the work so as to remove a desired increment of material.

It is to be noted that the diagrammatic showing of the complete machine in Fig. 1 does not include certain details which would be present in all such hobbing type gear grinding machines. For instance, means would be provided for positioning the grinding wheel carriage 2 in a horizontal plane tangentially relative to the work-piece 7, in order that the hobbing type grinding wheel 15 can initially be properly located relative to the work-piece 7. Such details will be understood by those skilled in the art and are not material to an understanding of the present invention.

In accordance with the invention, the fixture 6 is provided with a fixed spindle 6a carrying a work support member 7a which is not rigidly secured relative to the work driving spindle 3 but has special means for either locking member 7a to rotate with spindles 6a and 3 or permitting a limited degree of oscillation therebetween. Mechanism by which this may be accomplished is shown in detail in Figs. 2 and 3.

In Fig. 2 it will be seen that the work-piece 7 is clamped to the work support bushing 7a. The clamping means is represented diagrammatically as being a plate member 6b secured by bolts 6c. The gear 7 rests on a radially extending flange portion 6d of the work support bushing 7a. The work support bushing 7a houses bearings 7b which are fitted on the fixed work support spindle 6a. The lower end portion 6e of spindle 6a is secured to pedestal 6 by bolts 6f and a clamp plate 6g. Pedestal 6 is in turn bolted to machine work-table 5 by suitable bolts 5a, with the axis of spindle 6a coaxial with the drive spindle 3.

It will be apparent that the structure described so far would permit free relative rotation between the drive spindle 3 and the work support member 7a. The means for positively driving the work support member 7a from the drive spindle 3 comprises at least one driving dog which may be in the form of a stud 6k secured in the radial flange 6d. Spaced circumferentially from either side of the dog 6k are a pair of abutment members 6l, 6m, as shown in Fig. 3. Each of these abutments carries a threaded stud member 6n adapted to be adjusted relative to the abutment 6k and locked in position by locknuts 6p.

It will be obvious from a consideration of Fig. 3 that the work support member 7a is positively driven, in "locked" condition relative to the drive spindle 3, when the adjustable studs 6n are positioned so as to snugly engage the sides of the driving dog 6k. When it is desired to provide a limited degree of oscillation between the work 7 and the driving spindle 3, one of the studs 6n is backed off a small amount, so as to provide the clearance space indicated at 6r in Fig. 3. This clearance is actually shown much exaggerated in Fig. 3, since it would ordinarily be on the order of a few thousandths of an inch in actual practice.

A more convenient means for locking or unlocking the work support member relative to the driving spindle during operation, without stopping the machine, is illustrated in Figs. 4, 5, 6. The lower end of work support spindle 6s carries a locking arm 5b attached rigidly to it. Arm 5b has a locking plate member 5c secured to it with an accurately finished slot 30 therein. A cam member 29 is closely fitted in a bushing 5d carried in the base of pedestal 6'. Rotation of cam 29 clockwise, as seen in Fig. 5, a limited predetermined amount opens a small clearance between it and the walls of slot 30, which clearance allows arm 5b and spindle 6s to oscillate very slightly in the high precision ball bearings 31.

As illustrated in Fig. 6, cam 29 is kept in the "locked" or "no-clearance" position shown in Fig. 5 by a spring 32 biased against operating arm 33. When it is desired to allow the work-piece the above-mentioned degree of oscillation, a manually operated pilot valve 28 is opened to allow compressed air to enter pneumatic cylinder 27, compressing spring 32 and rotating cam member 29 so it forms a clearance with the walls of slot 30, allowing the limited movement of locking arm 5b. As shown in Fig. 4, the conduit 28a communicates motive fluid from valve 28 to cylinder 27, by way of an axial passage in spindle 6s, being connected to the end of the spindle by a suitable swivel fitting 28b.

The threaded sleeve 34 is adjusted by trial to determine how far air cylinder 27 will pull arm 33 to rotate cam member 29, which of course governs the "degree of freedom" experienced by work-piece 7.

It will be apparent that this arrangement has the advantage that the work spindle can be readily locked or unlocked during the grinding process without stopping rotation of table 5.

It will be understood that there may be two or more of the pneumatic cylinders 27 and related cams 29 spaced circumferentially around the work spindle, since such a symmetrical arrangement will help to avoid the imposition of any unbalanced forces on the work support spindle. This may be important since any such unbalanced forces, however slight, may introduce a small inaccuracy into the finish produced on the work-piece.

It will also be appreciated by those skilled in the art that numerous equivalent means may be employed for providing either locked or unlocked support of the work-piece relative to the driving spindle 3. It is necessary only that it be possible to very carefully restrict oscillation of the work support member 7a relative to the driving spindle 3 to a very small carefully predetermined amount. The precise magnitude of this limited oscillation will depend on many factors, such as the size of the gear being finished, the size of the gear teeth, the rotational speed of the grinding wheel and the rate of vertical feed, the depth of the cut taken on each pass, etc.

In operation, the work-piece 7, previously rough cut by a milling, hobbing, or other suitable machining process, is clamped to the support 7a. The grinding wheel carriage 2 is appropriately positioned relative to the work-piece 7 and the fixture locking means secured so that work support 7a is positively driven in exact phase with spindle 3. With clutch 25 engaged, the first vertical pass is made through the gear teeth, the work-piece 7 being driven in exact synchronism with the grinding hob 15 by the index gearing 22 and shaft 12. After the first vertical pass, the gear 7 is fed toward the grinding carriage 2 by the in-feed lead screw 13 and a second vertical pass made. This process is repeated, each vertical pass removing perhaps .003 to .004 inch from the thickness of the gear teeth (with a gear on the order of about 31 inches diameter). This rough finishing process is continued until the thickness of the teeth is within about .005" of the finished contour desired. The work support locking means is then adjusted so that the member 7a has the preselected degree of freedom for oscillation about its axis relative to the driving spindle 3. An additional one or two vertical passes are then made to "clean up" the last remaining errors in the tooth contour and remove the final .005" of metal remaining on the gear.

It is discovered that finish cutting the gear with this preselected degree of freedom for oscillatory movement between the work and the driving spindle has an important effect in preventing the "fish-scale" defect.

The precise manner in which this result is obtained is not clearly understood; but it is believed that, when the fixture is in the "unlocked" condition, the grinding wheel tends to "ride over" any deviation from the theoretically correct contour which it encounters in the work-piece, and thereby tends to render more uniform the torsional loading on the comparatively long drive-shafts 12, 17, 18, etc., and likewise renders more uniform the loading on the respective bearings supporting these shafts and the tooth pressure between the respective pairs of mating gears in the comparatively complex gear trains by which the grinding wheel spindle 15a is connected to the work spindle 3. It will, of course, be appreciated that any change in the thickness of the oil film in the bearings or between the gear teeth, or any change in the torsional deflection of the long drive-shafts will introduce minute deviations in the position of the gear 7 relative to the theoretical position it should occupy if in exact synchronism with the grinding wheel 15.

When it is realized that the "fish-scale" defect is produced by discontinuities in the gear tooth surface on the order of .0002" deep, at a radius of about 15" from the axis of the driving spindle 3, it will be readily understood that changes too small to detect in the thickness of the oil film in the bearings and between the gear teeth, or in the torsional "wind-up" of the long drive-shafts can be cumulative in effect and will easily account for the occurrence of the "fish-scaling."

The precise degree of freedom required between the work support 7a and drive spindle 3 in order to avoid this "fish-scale" defect, can of course be readily ascertained in actual operation by trial. It is believed that the degree of freedom should be sufficiently small as to cause the grinding wheel to operate in almost perfect synchronism, so that the "high spots" on the gear teeth will be dressed down to the theoretically correct contour. The very small degree of freedom permitted between work-piece and drive spindle prevents the grinding wheel from biting into the work so hard as to change the loading on the bearings, gears, drive-shafts, etc., to a degree sufficient to produce the fish-scaling.

While only one hobbing type gear finishing machine has been described to illustrate the invention, and that in only a very diagrammatic fashion, it will be obvious that the invention is applicable to gear finishing machines of other analogous types. It will also be apparent that the precise means for effecting the locked and unlocked condition of the work-piece may take many equivalent mechanical forms. It is of course intended to cover by the appended claims all such modifications as fall within the true spirit and scope of the invention.

What we claim as new and desire to secure by Letters Patent of the United States is:

1. The method of finishing a work-piece such as a gear or the like which includes the steps of first rough cutting the gear by driving a hobbing type tool in exact synchronism with the rotation of the work-pice, and then finish cutting the piece to remove the last inaccuracies with the work-piece free to oscillate about its axis by a preselected limited amount, whereby changes in loading on the drive mechanism and gearing are maintained below a preselected magnitude.

2. The method of grinding a gear or like work-piece which includes the steps of first rough grinding the piece with a hob type grinding wheel driven in exact synchronism with the work-piece and subsequently permitting the piece to oscillate about its axis by a preselected limited amount for the final finishing, whereby changes in loading on the drive mechanism are minimized.

3. A gear finishing machine comprising a power-driven hob type cutting wheel and a rotatable work supporting table with means for positively driving the work-table in exact synchronism with rotation of the cutting wheel, means for supporting a work-piece on the table and including means for effecting a preselected limited degree of oscillation of the work-piece about the axis of and relative to the table, and means for locking the work-piece support means for driving the work-piece in exact synchronism with the cutting wheel during a portion of the finishing process.

4. A fixture for supporting a work-piece such as a rough cut gear or the like on the rotatable work-table of a hobbing type finishing machine, comprising a pedestal member adapted to be secured to the table, a work-supporting member journaled on said pedestal for oscillation about the axis of the table, the axis of oscillation of the member being coincident with the axis of rotation of the table, means for positively limiting to a predetermined small degree the relative oscillation permitted between the pedestal and work-support member, means for locking the work-support member to rotate with the pedestal, said oscillation limiting means comprising a cam member supported on the pedestal member and having a portion disposed in a recess formed in an adjacent portion of a member fixed to the work-supporting spindle, and means for moving said cam to a first position in which the cam positively engages the walls of said recess for locking the work-supporting spindle relative to the pedestal, or to a second position in which a predetermined clearance space is defined between the cam and the walls of said recess for permitting limited oscillation of the work-support relative to the pedestal.

5. A gear finishing machine in accordance with claim 3 in which the oscillation limiting means includes a first abutment member secured to the work-supporting member, and a pair of second abutment members secured to the work-table and having portions spaced from the respective opposite sides of said first abutment member, and adjustable means for varying the effective spacing between said first and second abutment means.

6. A fixture for supporting a work-piece such as a rough cut gear or the like on the rotatable work-table of a hobbing type finishing machine, comprising a pedestal member adapted to be secured to the table, a work-supporting member journaled on said pedestal for oscillation about the axis of the table, the axis of oscillation of the member being coincident with the axis of rotation of the table, means for positively limiting to a predetermined small degree the relative oscillation permitted between the pedestal and work-support member, means for locking the work-support member to rotate with the pedestal, said oscillation limiting means comprising a locking member journaled in the pedestal and having a cam portion disposed in cooperative relation with the walls of a recess defined in a radially extending portion of the work-support member, and means for moving said cam to a first position in which the cam positively engages the walls of said recess or to a second position in which a predetermined small clearance space is defined between the cam and the walls of the recess.

References Cited in the file of this patent

UNITED STATES PATENTS

| | | |
|---|---|---|
| 31,078 | Glover | Jan. 8, 1861 |
| 692,177 | Burger | Jan. 28, 1902 |
| 953,059 | Roberts | Mar. 29, 1910 |
| 1,036,199 | Eberhardt et al. | Aug. 20, 1912 |
| 1,997,228 | Nichols | Apr. 9, 1935 |
| 2,108,547 | Nyland | Feb. 15, 1938 |
| 2,307,238 | Ross | Jan. 5, 1943 |